(12) United States Patent
Zhu

(10) Patent No.: US 11,721,328 B2
(45) Date of Patent: Aug. 8, 2023

(54) METHOD AND APPARATUS FOR AWAKENING SKILLS BY SPEECH

(71) Applicant: AI SPEECH CO., LTD., Jiangsu (CN)

(72) Inventor: Chengya Zhu, Jiangsu (CN)

(73) Assignee: AI SPEECH CO., LTD., Jiangsu (CN)

( * ) Notice: Subject to any disclaimer, the term of this patent is extended or adjusted under 35 U.S.C. 154(b) by 0 days.

(21) Appl. No.: 17/758,075

(22) PCT Filed: Oct. 26, 2020

(86) PCT No.: PCT/CN2020/123643
§ 371 (c)(1),
(2) Date: Jun. 28, 2022

(87) PCT Pub. No.: WO2021/135561
PCT Pub. Date: Jul. 8, 2021

(65) Prior Publication Data
US 2023/0075023 A1    Mar. 9, 2023

(30) Foreign Application Priority Data
Dec. 31, 2019    (CN) .......................... 201911422397.2

(51) Int. Cl.
*G10L 15/18* (2013.01)
*G06F 16/2455* (2019.01)
(Continued)

(52) U.S. Cl.
CPC ...... *G10L 15/1815* (2013.01); *G06F 16/2455* (2019.01); *G06F 40/279* (2020.01);
(Continued)

(58) Field of Classification Search
CPC .... G06F 16/2455; G06F 40/279; G06F 40/30; G10L 2015/088; G10L 15/1815; G10L 15/22; G10L 15/30
See application file for complete search history.

(56) References Cited

U.S. PATENT DOCUMENTS

| 10,614,803 B2 | 4/2020 | Xie et al. |
| 11,322,138 B2 | 5/2022 | Li et al. |

(Continued)

FOREIGN PATENT DOCUMENTS

| CN | 107134279 A | 9/2017 |
| CN | 107316643 A | 11/2017 |

(Continued)

OTHER PUBLICATIONS

International Search Report and Written Opinion dated Jan. 27, 2022, in connection with International Patent Application No. PCT/CN2020/123643, filed Oct. 26, 2020, 12 pgs. (including translation).

(Continued)

*Primary Examiner* — Eric Yen
(74) *Attorney, Agent, or Firm* — Chiesa, Shahinian & Giantomasi PC

(57) ABSTRACT

The present invention discloses a method and apparatus for awakening skills by speech, which are applied to an electronic device. The method for awakening skills by speech includes: recognizing awakening text information corresponding to a speech request message to be processed; invoking a service skill semantic model to determine a target service field corresponding to the awakening text information and a corresponding first confidence, and invoking a knowledge skill semantic model to determine a knowledge reply answer corresponding to the awakening text information and a corresponding second confidence; and selecting to awaken one of a knowledge skill and a target service skill corresponding to the target service field based on the first confidence and the second confidence. Accordingly, the probability of erroneously awakening a skill based on the speech message can be reduced.

15 Claims, 4 Drawing Sheets

(51) Int. Cl.
  *G06F 40/279* (2020.01)
  *G06F 40/30* (2020.01)
  *G10L 15/22* (2006.01)
  *G10L 15/30* (2013.01)
  *G10L 15/08* (2006.01)

(52) U.S. Cl.
  CPC .............. *G06F 40/30* (2020.01); *G10L 15/22* (2013.01); *G10L 15/30* (2013.01); *G10L 2015/088* (2013.01)

(56) References Cited

U.S. PATENT DOCUMENTS

| | | | | |
|---|---|---|---|---|
| 2007/0050371 | A1* | 3/2007 | Johnson | G06F 16/972 |
| 2009/0216538 | A1* | 8/2009 | Weinberg | G10L 15/1815 |
| | | | | 704/E11.001 |
| 2012/0035931 | A1* | 2/2012 | LeBeau | H04M 1/72403 |
| | | | | 704/E15.005 |
| 2013/0346078 | A1* | 12/2013 | Gruenstein | G10L 15/22 |
| | | | | 704/235 |
| 2014/0337032 | A1* | 11/2014 | Aleksic | G10L 15/32 |
| | | | | 704/257 |
| 2018/0052823 | A1 | 2/2018 | Scally et al. | |
| 2019/0001219 | A1* | 1/2019 | Sardari | G06N 5/025 |
| 2019/0005954 | A1 | 1/2019 | Xie et al. | |
| 2019/0130912 | A1 | 5/2019 | Yadgar et al. | |
| 2019/0251963 | A1 | 8/2019 | Li et al. | |
| 2020/0286628 | A1* | 9/2020 | Helmer | G06F 11/3476 |

FOREIGN PATENT DOCUMENTS

| | | |
|---|---|---|
| CN | 107657949 A | 2/2018 |
| CN | 107871506 A | 4/2018 |
| CN | 108335696 A | 7/2018 |
| CN | 108694942 A | 10/2018 |
| CN | 109493863 A | 3/2019 |
| CN | 109658271 A | 4/2019 |
| CN | 110299136 A | 10/2019 |
| CN | 110570861 A | 12/2019 |
| CN | 111081225 A | 4/2020 |
| EP | 3196816 A1 | 7/2017 |
| JP | 2013190985 A | 9/2013 |
| JP | 2018503857 A | 2/2018 |
| WO | 2018033897 A2 | 2/2018 |

OTHER PUBLICATIONS

Search Report dated Feb. 24, 2022, in connection with Chinese Patent Application No. 201911422397.2, filed Dec. 31, 2019, 4 pgs. (including translation).

Cook, "Using Bots to Route customer Requests based on Sentiment and Emotion", retrieved online at https://www.twilio.com/blog/using-bots-to-route-customer-requests-based-on-sentiment-and-emotion-html, 2016, 9 pgs.

Supplementary European Search Report dated May 5, 2023 in connection with European Patent Application No. 20909040.6, filed Oct. 26, 2020, 7 pgs.

Notice of Reasons for Refusal dated Mar. 14, 2023 in connection with Japanese Patent Application No. 2022-540758, 8 pgs (including translation).

* cited by examiner

METHOD AND APPARATUS FOR AWAKENING SKILLS BY SPEECH

CROSS-REFERENCE TO RELATED APPLICATIONS

This application is a national stage of International Patent Application Serial No. PCT/CN2020/123643, filed Oct. 26, 2020, which claims priority to Chinese Patent Application No. 201911422397.2, filed Dec. 31, 2019; the disclosures of all are incorporated herein by reference in their entirety.

TECHNICAL FIELD

The present invention belongs to the field of Internet technologies, and in particular relates to a method and apparatus for waking up skills by speech.

BACKGROUND

With the continuous development of speech technology and artificial intelligence technology, speech wake-up technology has achieved significant development in the field of smart devices such as smart homes.

Currently, knowledge skills and service skills exist in smart devices. Knowledge skills are adopted to provide corresponding knowledge question-and-answer services for users of smart devices, such as providing corresponding answers to questions asked by various users. Service skills are adopted to provide corresponding services for users of smart devices, such as music service, taxi service, weather checking service, and so on.

However, when a conventional smart device recognizes a user's speech, it cannot identify whether a user's speech is intended to wake up a service skill or a knowledge skill, resulting in incorrect invocation of skills. For example, when a smart speaker receives a user's speech message "Who is mother of LI, Chen", if the music skill is awakened, the song "Who is mother" by the singer "LI, Chen" will be played, while an answer "Li Chen's mother is XXX" will be broadcasted as a reply if the knowledge skill is awakened.

There is not a better solution to the above problems in the industry at present.

SUMMARY

Embodiments of the present invention provide a method and apparatus for awakening skills by speech, which are adopted to solve at least one of the above technical problems.

In a first aspect, an embodiment of the present invention provides a method for awakening skills by speech, which is applied to an electronic device and includes: recognizing awakening text information corresponding to a speech request message to be processed; invoking a service skill semantic model to determine a target service field corresponding to the awakening text information and a corresponding first confidence, and invoking a knowledge skill semantic model to determine a knowledge reply answer corresponding to the awakening text information and a corresponding second confidence; and selecting to awaken a knowledge skill or a target service skill corresponding to the target service field based on the first confidence and the second confidence.

In a second aspect, an embodiment of the present invention provides an apparatus for awakening skills by speech, which is applied to an electronic device. The apparatus includes: a speech recognition unit configured to recognize awakening text information corresponding to a speech request message to be processed; a model invoking unit configured to invoke a service skill semantic model to determine a target service field corresponding to the awakening text information and a corresponding first confidence, and to invoke a knowledge skill semantic model to determine a knowledge reply answer corresponding to the awakening text information and a corresponding second confidence; and a skill awakening unit configured to select to awaken a knowledge skill or a target service skill corresponding to the target service field based on the first confidence and the second confidence.

In a third aspect, an embodiment of the present invention provides an electronic device, including: at least one processor, and a memory communicatively coupled to the at least one processor, wherein the memory stores instructions executable by the at least one processor, the instructions being executed by the at least one processor to enable the at least one processor to perform the steps of the above method.

In a fourth aspect, an embodiment of the present invention provides a storage medium storing a computer program, which, when being executed by a processor, performs the steps of the above method.

The beneficial effects of the embodiments of the present invention lie in that, when a speech request message is received, a service skill semantic model and a knowledge skill semantic model are adopted to determine a corresponding service field and reply answer in parallel, and output a corresponding confidence, such that a knowledge skill or a target service skill may be awakened. Therefore, matching of the speech message with the service skill and with the knowledge skill can be compared, and the probability of awakening a wrong skill according to the speech message can be reduced.

BRIEF DESCRIPTION OF THE DRAWINGS

In order to illustrate the technical solutions of the embodiments of the present invention more clearly, a brief description of the accompanying drawings used in the description of the embodiments will be given as follows. Obviously, the drawings in the following description illustrate some embodiments of the present disclosure. Those of ordinary skill in the art can also obtain other drawings based on these drawings without creative work.

DETAILED DESCRIPTION

Figure 1:
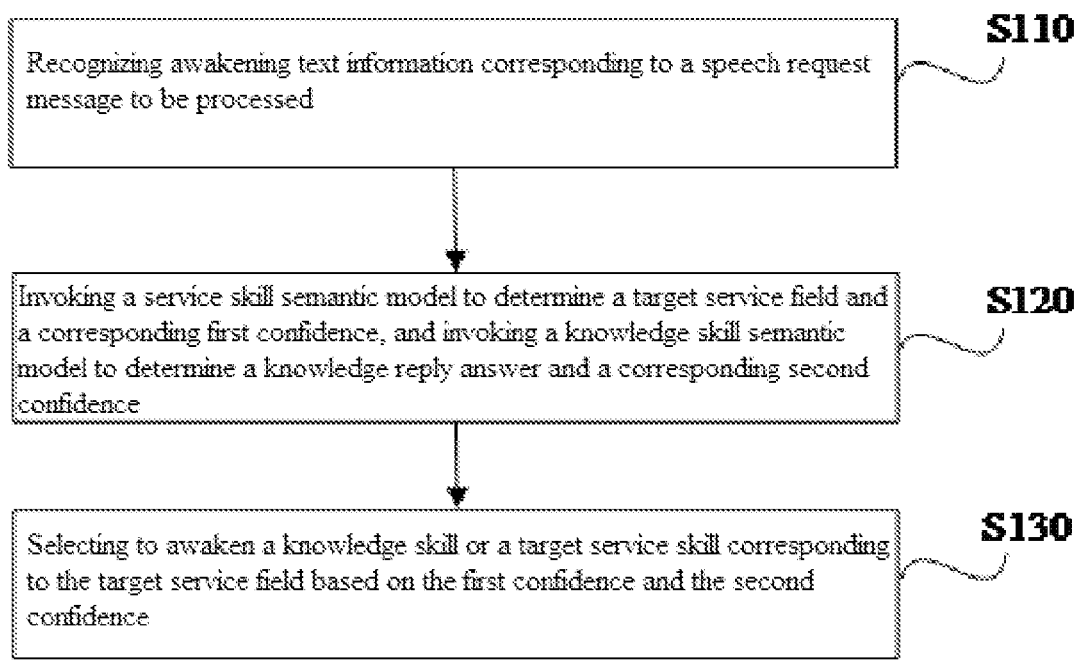
FIG. 1 shows a flowchart of an example of a method for awakening a skill speech according to an embodiment of the present invention.

To make the objects, technical solutions and advantages of the embodiments of the present invention clearer, the technical solutions in the embodiments of the present invention will be described clearly and completely below with reference to the accompanying drawings in the embodiments of the present invention. Obviously, the described are merely some but not all of the embodiments of the present invention. Based on the embodiments of the present invention, all other embodiments obtained by ordinary skilled in the art without inventive efforts shall fall within the scope of the present invention.

It should be noted that the embodiments in the present application and the features in these embodiments can be combined with each other without conflict.

The present invention can be described in the general context of computer-executable instructions such as program modules executed by a computer. Generally, program modules include routines, programs, objects, elements, and data structures, etc. that perform specific tasks or implement specific abstract data types. The present invention can also be practiced in distributed computing environments in which tasks are performed by remote processing devices connected through a communication network. In a distributed computing environment, program modules may be located in local and remote computer storage media including storage devices.

In the present invention, "module", "means", "system", etc. refer to related entities applied to a computer, such as hardware, a combination of hardware and software, software or software in execution, etc. In detail, for example, an element may be, but is not limited to, a process running on a processor, a processor, an object, an executable element, an execution thread, a program, and/or a computer. Also, an application program or a script program running on the server or the server may be an element. One or more elements can be in the process and/or thread in execution, and the elements can be localized in one computer and/or distributed between two or more computers and can be executed by various computer-readable media. Elements can also be based on signals with one or more data packets, for example, a signal from data that interacts with another element in a local system, a distributed system, and/or interacts with other systems through signals on a network on the internet communicates through local and/or remote processes.

Finally, it should be noted that in this specification, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

In order to solve the problems in the prior art, the present invention provides a method and apparatus for awakening skills by speech, which can be applied to an electronic device. The electronic device may be a terminal device or a server. The terminal device may be, for example, any electronic device with a human-machine speech interaction function, such as a smart speaker, an OBU (On Board Unit), a smart TV, a smart phone, a tablet computer, a smart watch, etc., which is not limited in the present invention. The server may be a server device that provides technical support for realizing human-computer speech interaction for a terminal device.

FIG. 1 shows a flowchart of an example of a method for awakening skills by speech according to an embodiment of the present invention.

As shown in FIG. 1, in step 110, an electronic device recognizes awakening text information corresponding to a speech request message to be processed. The speech request message may be collected by a microphone collecting device of an intelligent speech device. In addition, the awakening text information corresponding to the speech request message may be determined through various speech recognition technologies, which is not limited herein.

In step 120, the electronic device invokes a service skill semantic model to determine a target service field corresponding to the awakening text information and a corresponding first confidence, and invokes a knowledge skill semantic model to determine a knowledge reply answer corresponding to the awakening text information and a corresponding second confidence. For example, the service skill semantic model and the knowledge skill semantic model may be invoked in parallel to make predictions synchronously, and output corresponding prediction results and confidences. In addition, the service skill semantic model may be semantically trained using a service field label set, and the knowledge skill semantic model may be semantically trained using a knowledge question-and-answer label set, and various training methods may be adopted, which is not limited here.

In step 130, the electronic device selects to awaken one of a knowledge skill and a target service skill corresponding to the target service field based on the first confidence and the second confidence. For example, when the first confidence is greater than the second confidence, the target service skill may be selected to be awakened, and when the first confidence is less than or equal to the second confidence, the knowledge skill may be selected to be awakened. Confidence may represent a predicted probability and may be a value between 0 and 1. Therefore, according to this embodiment, a predicted probability of a user's speech intent between a music skill and the knowledge skill may be compared, thereby reducing the probability of awakening a wrong skill.

Figure 2:
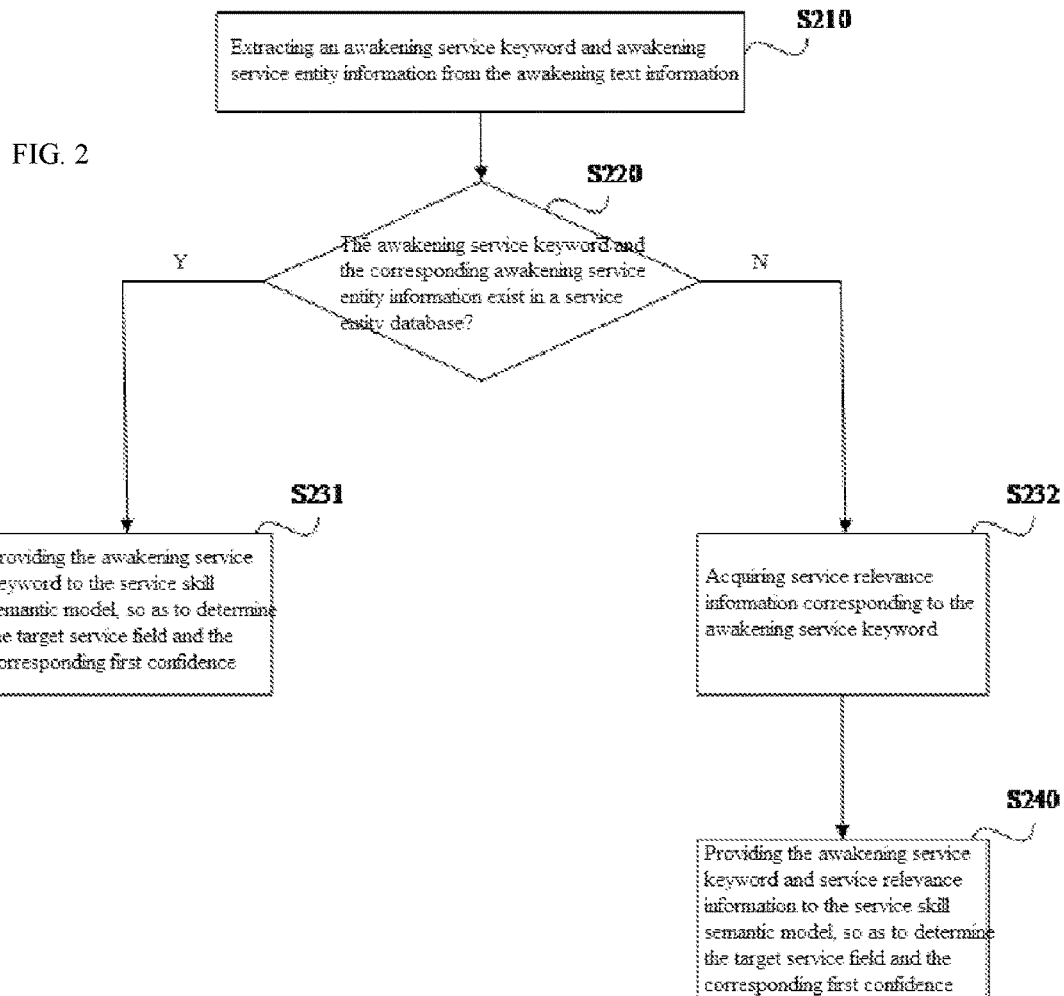
FIG. 2 shows a flowchart of an example of an operation performed by invoking a service skill semantic model according to an embodiment of the present invention.

FIG. 2 shows a flowchart of an example of an operation performed by invoking a service skill semantic model according to an embodiment of the present invention.

As shown in FIG. 2, in step 210, the electronic device extracts a awakening service keyword and awakening service entity information from the awakening text information. The awakening service keyword may be a keyword in the awakening text information and has service attributes, and the awakening service entity information may be a word in the awakening text information and has entity attributes. For example, the awakening service keyword may be "Unforgettable Tonight", and the awakening service entity information may be singer "LI, Guyi". In addition, various keyword extraction models may be adopted to extract the above awakening service keyword and awakening service entity information, which are not limited herein.

In step 220, the electronic device determines whether the awakening service keyword and the corresponding awakening service entity information exist in a service entity database. The service entity database includes a plurality of service keywords and corresponding service entity information, in which one service keyword may correspond to a plurality of service entity information. Following the above example, a plurality of singers such as "LI, Guyi", "DONG, Wenhua", and "ZHANG, Ye" corresponding to the song "Unforgettable Tonight" are stored in the service entity database. In addition, data information in the service entity database may be constructed through pre-collection, which can reflect the relationship between service keywords and service entities, such as which singers have sung a song with the same title, or which actors have performed a movie with the same title and so on.

If in step 220 it is determined that the awakening service keyword and the corresponding awakening service entity information exist in the service entity database, the method jumps to step 231. In addition, if in step 220 it is determined that the awakening service keyword or the corresponding awakening service entity information do not exist in the service entity database, the method jumps to step 232.

In step 231, the electronic device provides the awakening service keyword to the service skill semantic model, so as to determine the target service field and the corresponding first confidence. Following the above example, if the awakening service keyword and the corresponding awakening service entity information are "Unforgettable Tonight" and "LI, Guyi" respectively, "Unforgettable Tonight" may be directly provided to the service skill semantic model for prediction operation.

In step 232, the electronic device acquires service relevance information corresponding to the awakening service keyword. For example, the awakening service keyword may be provided to a service relevance analysis tool to acquire the corresponding service relevance information. In addition, the corresponding service relevance information may also be determined by analyzing popularity information corresponding to the awakening service keyword, and the specific details are as follows.

In step 240, the electronic device provides the awakening service keyword and service relevance information to the service skill semantic model, so as to determine the target service field and the corresponding first confidence. In this case, the input of the service skill semantic model includes the service relevance information in addition to the awakening service keyword. That is, the service relevance information can affect the service skill semantic prediction process, such that the determined first confidence for the target service field has higher accuracy.

Figure 3:
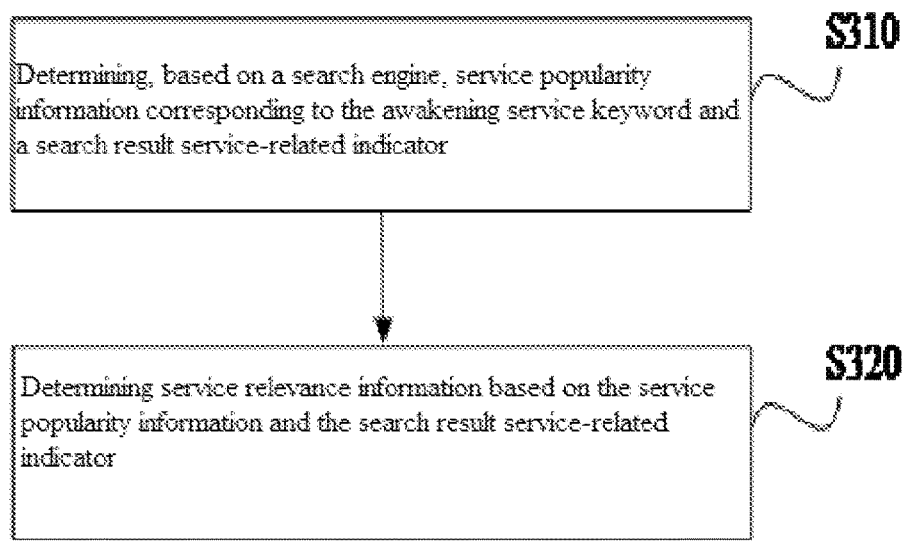
FIG. 3 shows a flowchart of an example of an operation of determining service relevance information according to an embodiment of the present invention.

FIG. 3 shows a flowchart of an example of an operation of determining service relevance information according to an embodiment of the present invention.

In step 310, the electronic device determines, based on a search engine, service popularity information corresponding to the awakening service keyword and a search result service-related indicator. In an exemplary embodiment, the search engine is invoked based on the awakening service keyword to acquire the above service popularity information and search result service-related indicator from the search engine, or, acquire a search result from the search engine and determine the corresponding service popularity information and search result service-related indicator through analysis. Here, the search result service-related indicator may reflect the degree of correlation between the search result determined by the search engine and the service.

In some embodiments, the search result corresponding to the awakening service keyword is determined based on the search engine. In addition, the search result service-related indicator corresponding to the search result is determined based on a preconfigured search result evaluation strategy. For example, a predetermined number (e.g., 10) of top-ranked search results may be used to evaluate the relevance of the target service field, and the search result service-related indicator may be multi-leveled as strong correlation, general correlation or weak correlation.

In order to ensure the accuracy of the service-related indicator, a plurality of retrievals may also be performed in the form of a retrieval-type variant to determine the service-related indicator. Specifically, the awakening service keyword may be provided to the search engine to determine a corresponding first search result, and the awakening service keyword and the service name corresponding to the target service field may be provided to the search engine to determine a corresponding second search result. Furthermore, the first search result and the second search result may be evaluated through the search result evaluation strategy, so as to determine the corresponding search result service-related indicator. For example, the correlation between the first search result, the second search result and the service may be comprehensively considered.

In step 320, the electronic device determines service relevance information based on the service popularity information and the search result service-related indicator. For example, the service relevance information may include the service popularity information and the search result service-related indicator, or the service popularity information and the search result service-related indicator are weighted for the service relevance information.

Figure 4:
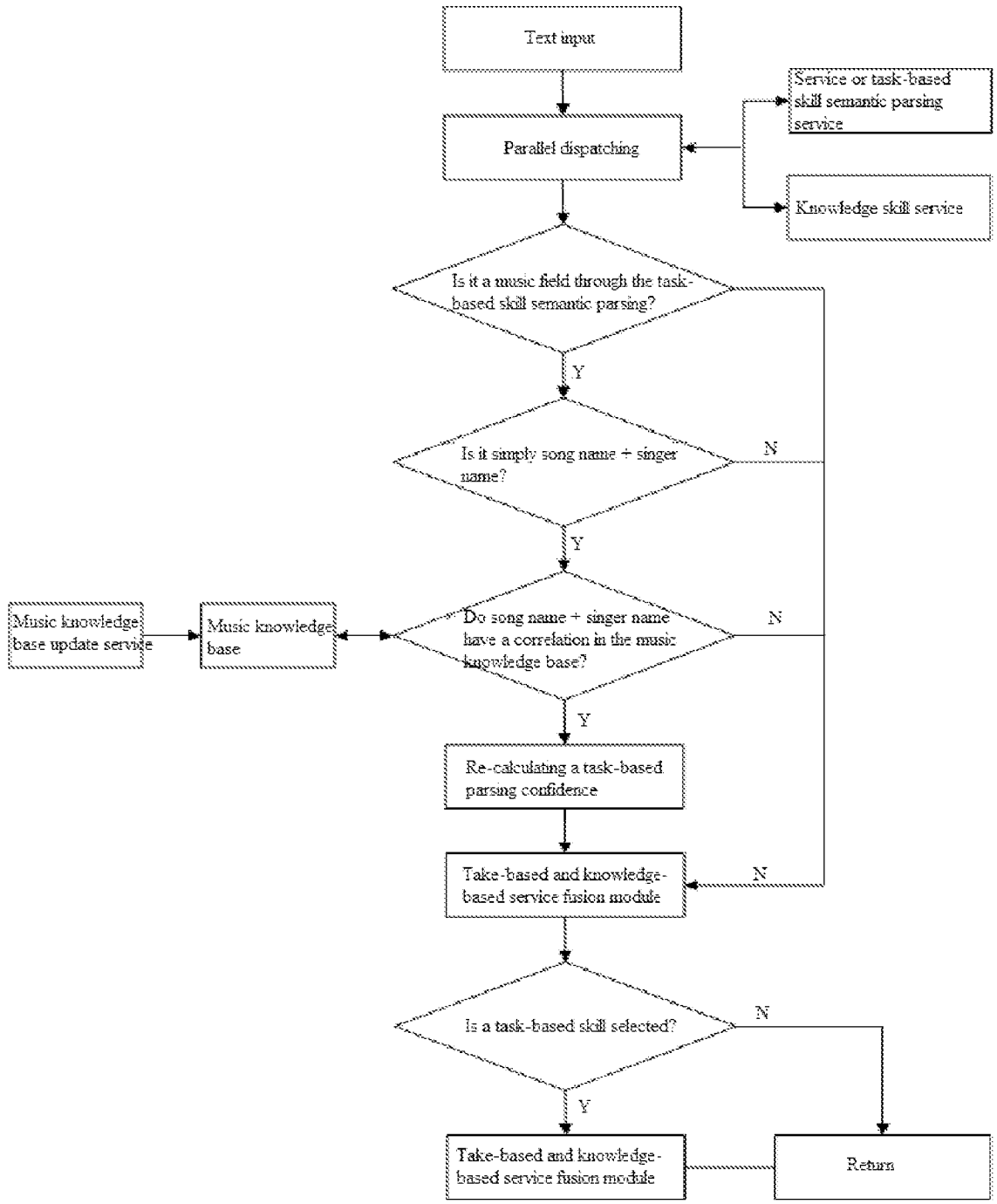
FIG. 4 shows a schematic flowchart of an example of a method for awakening a music skill by speech according to an embodiment of the present invention.

FIG. 4 shows a principle flowchart of an example of a method for awakening a music skill by speech according to an embodiment of the present invention.

The service skills in this embodiment may be directed to various services, and in the following embodiments, only music skill is taken as an example for description.

It should be noted that in the field of music, based on a regular matching method, such an awakening manner as "song name+singer name" exists, which is often used in many speaker products. For example, when a user directly says "Andy Lau's Forgetting Love Water", the song "Forgetting Love Water" may be played directly. In order to facilitate expansion, "Andy Lau" is bound to a corresponding song name lexicon, and "Forgetting Love Water" is also bound to a corresponding singer name lexicon. Since a lot of information exists in the two lexicons, it is easy to invoke erroneous service skills and knowledge skills.

In the related art, a general way is to directly delete items corresponding to a song in the song name lexicon or items corresponding to a singer in the singer name lexicon. However, this will cause a failure in semantic parsing for a specified song name or singer name being spoken in an actual situation. In addition, in some application scenarios, a user may also expect that even if wrong singer information is spoken, the music playback operation can still be performed according to song information being spoken. For example, when the user says "Andy Lau's Kiss Goodbye", no match can be found but the song "Kiss Goodbye" can still be played.

In this embodiment, popularity information and search information of a music song name may be acquired through a crawler, such that during semantic analysis, the popularity information, search information, etc., and confidence information will be attached to the song name. Here, regarding the process for acquiring search information, the "song name" may be directly put into the search engine to determine whether a first entry is a music entry, and if the first entry is not a music entry, the search engine searches for "song name+'song'" (e.g., "song Kiss Goodbye") and determines whether the first entry is a music entry. Therefore, the search information may have various search result-related states.

In addition, a music knowledge base is built in this embodiment, so that it is possible to search by song name for a list of all corresponding singers.

In addition, when the semantic analysis shows that a semantic slot only has song name+singer name, the music knowledge base will be checked to see if they match each other. If they match each other, a task-based skill confidence is then compared with a knowledge-based skill confidence. On the other hand, if they do not match each other, the song popularity information, search information and confidence information are combined to recalculate a new confidence, and then the knowledge-based skill confidence is compared again with the task-based skill confidence.

In the process shown in FIG. 4, after text input, task-based skill semantic parsing and knowledge-based skill are invoked in parallel. The task-based skill returns a plurality of field semantic parsing results (including semantic slot information and confidence information, and if the semantic slot is the song name, popularity and search information are included), while the knowledge-based skill returns information such as an answer result and a confidence.

In addition, after the results of both skills are acquired, whether the task-based skill returns the music field is determined (it is possible for the task-based skill to return a plurality of field analysis results).

Then, if the returned service field includes the music field, whether the parsed semantic slot is simply "song name+singer name" is determined.

Then, if it is "song name+singer name", the music knowledge base is invoked to determine whether the song name and the singer name match each other.

Then, if the song name+singer name match each other, a task-based semantic parsing result and knowledge-based skill dispatching fusion module is invoked.

Then, if the song name and singer name do not match each other, the task-based skill analysis confidence is calculated again (by combining search information, popularity information, and confidence information), and then the fusion module is invoked to select the task-based skill or the knowledge-based skill. If the task-based skill is selected, one of a plurality of task-based skills is selected through a fusion algorithm. If the knowledge-based skill is selected, the knowledge-based result will be organized and returned by using an agreed protocol by the fusion module.

Table 1 shows an experimental data table before and after the method for awakening a music skill by speech is applied according to the embodiment of the present invention.

Figure 5:
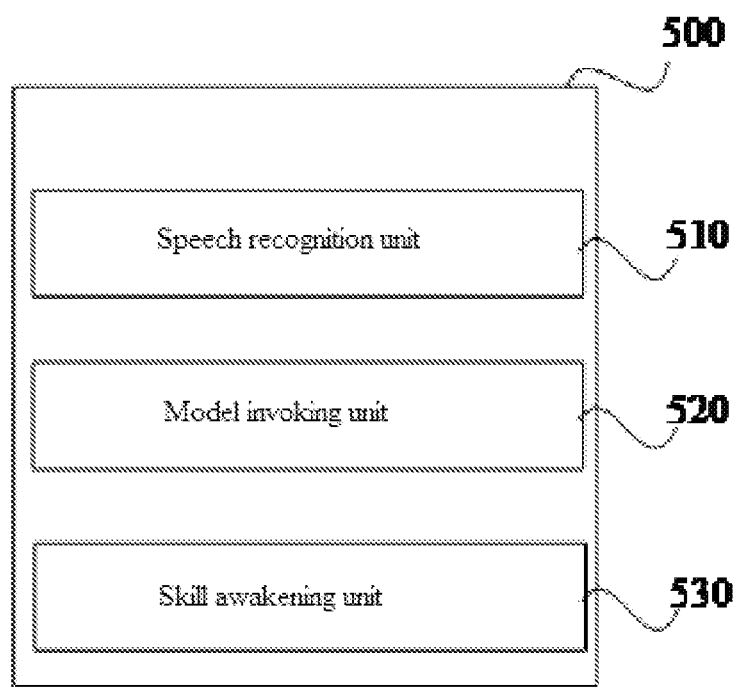
FIG. 5 shows a structural block diagram of an example of an apparatus for awakening skills by speech according to an embodiment of the present invention.

As shown in FIG. 5, the apparatus for awakening skills by speech 500 includes a speech recognition unit 510, a model invoking unit 520, and a skill awakening unit 530.

The speech recognition unit 510 is configured to recognize awakening text information corresponding to a speech request message to be processed. For the operation of the speech recognition unit 510, reference may be made to the description above with reference to step 110 in FIG. 1.

The model invoking unit 520 is configured to invoke a service skill semantic model to determine a target service field corresponding to the awakening text information and a corresponding first confidence, and to invoke a knowledge skill semantic model to determine a knowledge reply answer corresponding to the awakening text information and a corresponding second confidence. For the operation of the model invoking unit 520, reference may be made to the description above with reference to step 120 in FIG. 1.

The skill awakening unit 530 is configured to select to awaken one of a knowledge skill and a target service skill corresponding to the target service field based on the first confidence and the second confidence. For the operation of the skill awakening unit 530, reference may made to the above description with reference to step 130 in FIG. 1.

The apparatus according to the embodiment of the present invention may be adopted to execute the corresponding method embodiment of the present invention, and correspondingly achieve the technical effects achieved by the above method embodiment of the present invention, which will not be repeated here.

In the embodiments of the present invention, relevant functional modules may be implemented by a hardware processor.

On the other hand, an embodiment of the present invention provides a storage medium storing a computer program which is executed by a processor to perform the steps of the above method for awakening skills by speech.

The above-mentioned products can perform the method according to the embodiments of the present application, and have corresponding function modules and beneficial effects for performing the method. For technical details that are not described in detail in this embodiment, reference may be made to the method provided in the embodiments of the present application.

TABLE 1

| Method | Field | Total | TP | FP | TN | FN | recall | precision | accuracy | F value |
| --- | --- | --- | --- | --- | --- | --- | --- | --- | --- | --- |
| Before optimization | Music | 13753 | 8225 | 3573 | 949 | 529 | 0.93957048206534 | 0.69715205967113 | 0.69102139198554 | 0.80040871934605 |
| After optimization | Music | 13753 | 8047 | 2102 | 2420 | 707 | 0.91923692026502 | 0.79288599862055 | 0.78841518529678 | 0.85139924879649 |

As shown in Table 1, TP: positive class, the task-based skill being hit; TN: negative class, the knowledge-based skill being hit; FP: negative class is discriminated as positive class; FN: positive class is discriminated as negative class; recall: recall rate (TP/(TP+FN)); precision: precision rate (TP/(TP+FP)); accuracy: accuracy rate ((TP+TN)/(TP+FP+TN+FN)); F value: (2*precision*recall/(precision+recall)).

It can be seen that, before and after optimization, the F value is increased by 5%. In addition, if the fusion algorithm is adjusted or optimization is done case by case, better optimization results can be obtained.

FIG. 5 shows a structural block diagram of an example of an apparatus for awakening skills by speech according to an embodiment of the present invention.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices; and (4) Other electronic devices with data interaction function.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

What is claimed is:

1. A method for awakening skills by speech, applied to an electronic device, the method comprising:
    recognizing awakening text information corresponding to a speech request message to be processed;
    invoking a service skill semantic model to determine a target service field corresponding to the awakening text information and a corresponding first confidence, and invoking a knowledge skill semantic model to determine a knowledge reply answer corresponding to the awakening text information and a corresponding second confidence; and
    selecting to awaken one of a knowledge skill and a target service skill corresponding to the target service field based on the first confidence and the second confidence.

2. The method according to claim 1, wherein said invoking the service skill semantic model to determine the target service field corresponding to the awakening text information and the corresponding first confidence comprises:
    extracting an awakening service keyword and awakening service entity information corresponding to the awakening service keyword from the awakening text information;
    judging whether the awakening service keyword and the corresponding awakening service entity information exist in a service entity database, the service entity database comprising a plurality of service keywords and corresponding service entity information; and
    when the awakening service keyword and the corresponding awakening service entity information exist in the service entity database, providing the awakening service keyword to the service skill semantic model to determine the target service field and the corresponding first confidence.

3. The method according to claim 2, wherein when the awakening service keyword or the corresponding awakening service entity information does not exist in the service entity database, the method further comprises:
    acquiring service relevance information corresponding to the awakening service keyword; and
    providing the awakening service keyword and the service relevance information to the service skill semantic model, so as to determine the target service field and the corresponding first confidence.

4. The method according to claim 3, wherein said acquiring service relevance information corresponding to the awakening service keyword comprises:
    determining, based on a search engine, service popularity information and a search result service-related indicator, corresponding to the awakening service keyword; and
    determining the service relevance information based on the service popularity information and the search result service-related indicator.

5. The method according to claim 4, wherein said determining, based on the search engine, the service popularity information and the search result service-related indicator, corresponding to the awakening service keyword comprises:
    determining a search result corresponding to the awakening service keyword based on the search engine; and
    determining a search result service-related indicator corresponding to the search result based on a preconfigured search result evaluation strategy.

6. The method according to claim 5, wherein said determining the search result corresponding to the awakening service keyword based on the search engine comprises:
    providing the awakening service keyword to the search engine to determine a corresponding first search result; and
    providing the awakening service keyword and a service name corresponding to the target service field to the search engine, so as to determine a corresponding second search result.

7. The method according to claim 1, wherein the target service skill comprises a music skill.

8. An electronic device, comprising: at least one processor, and a memory communicatively coupled to the at least one processor, wherein the memory stores instructions executable by the at least one processor, the instructions being executed by the at least one processor to enable the at least one processor to perform the steps of the method of claim 1.

9. A non-transitory computer-readable storage medium storing a computer program which, when being executed by a processor, perform the steps of the method of claim 1.

10. A non-transitory computer-readable storage medium storing a computer program which, when being executed by a processor, perform the steps of the method of claim 2.

11. A non-transitory computer-readable storage medium storing a computer program which, when being executed by a processor, perform the steps of the method of claim 3.

12. A non-transitory computer-readable storage medium storing a computer program which, when being executed by a processor, perform the steps of the method of claim 4.

13. A non-transitory computer-readable storage medium storing a computer program which, when being executed by a processor, perform the steps of the method of claim 5.

14. A non-transitory computer-readable storage medium storing a computer program which, when being executed by a processor, perform the steps of the method of claim 6.

15. A non-transitory computer-readable storage medium storing a computer program which, when being executed by a processor, perform the steps of the method of claim 7.

\* \* \* \* \*